United States Patent
Enright et al.

(10) Patent No.: US 7,235,196 B2
(45) Date of Patent: Jun. 26, 2007

(54) DISPLAY CAPSULES AND A METHOD OF MANUFACTURING THEREOF

(75) Inventors: Thomas E. Enright, Tottenham (CA); San-Ming Yang, Mississauga (CA); Ahmed Alzamly, Mississauga (CA); Naveen Chopra, Oakville (CA); Man C. Tam, Mississauga (CA)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 10/886,426

(22) Filed: Jul. 7, 2004

(65) Prior Publication Data

US 2006/0006560 A1    Jan. 12, 2006

(51) Int. Cl.
  *B01J 13/04* (2006.01)
  *B32B 5/16* (2006.01)
  *G02B 26/00* (2006.01)

(52) U.S. Cl. ............... 264/4.1; 428/402.2; 428/402.21; 359/296

(58) Field of Classification Search ................ 428/323, 428/320.2, 402.2; 264/4, 7; 359/296; 106/31.16
See application file for complete search history.

(56) References Cited

U.S. PATENT DOCUMENTS

| | | | |
|---|---|---|---|
| 4,143,103 A | 3/1979 | Sheridon | |
| 4,176,854 A | 12/1979 | Hill et al. | |
| 4,261,653 A | 4/1981 | Goodrich | |
| 4,438,160 A | 3/1984 | Ishikawa et al. | |
| 5,130,171 A * | 7/1992 | Prud'Homme et al. | 427/213.36 |
| 5,389,945 A | 2/1995 | Sheridon | |
| 5,604,027 A | 2/1997 | Sheridon | |
| 6,120,588 A * | 9/2000 | Jacobson | 106/31.16 |
| 6,335,818 B1 | 1/2002 | Torres | |
| 6,362,915 B1 | 3/2002 | Sheridon et al. | |
| 6,488,870 B1 * | 12/2002 | Chopra et al. | 264/4.1 |
| 6,496,298 B1 * | 12/2002 | Sheridon et al. | 359/296 |
| 6,524,500 B2 | 2/2003 | Sheridon et al. | |
| 6,703,074 B2 | 3/2004 | Sacripante et al. | |
| 6,703,075 B1 | 3/2004 | Lin et al. | |

* cited by examiner

*Primary Examiner*—James J. Seidleck
*Assistant Examiner*—Saira B. Haider
(74) *Attorney, Agent, or Firm*—Pepper Hamilton LLP

(57) ABSTRACT

A method for producing a display capsule includes the following steps. A multichromal bead having at least two surfaces differing from each other in optical and electrical characteristics is formed. A dispersing agent on an outer surface of the multichromal bead is applied, preferably via spray coating. The multichromal bead is then encapsulated. The invention is also directed to a method for producing multichromal capsules. A multichromal bead having at least two surfaces differing from each other in optical and electrical characteristics and further includes a charge control additive. A dispersing agent is applied on an outer surface of the multichromal bead to prevent diffusion of the charge control additive from the multichromal bead. The multichromal bead is encapsulated at an encapsulation reaction temperature greater than 40° C.

18 Claims, 3 Drawing Sheets

DISPLAY CAPSULES AND A METHOD OF MANUFACTURING THEREOF

BACKGROUND OF THE INVENTION

1. Field of the Invention

The description set forth herein relates generally to a method of producing display capsules. More particularly, the description relates to a method for producing multichromal capsules for use in displays having improved contrast properties and yield.

2. Description of Related Art

Capsules have a variety of uses. Various encapsulation techniques are available to fabricate these capsules. New capsules and encapsulation techniques are desired to expand the applications in which encapsulation technology may be useful. For example, the capsules and encapsulation techniques such as those described in U.S. Pat. No. 5,604,027 to Sheridon, incorporated by reference herein in its entirety, may be used in the manufacture of components for display devices, conventional display devices (some including microcapsules), components for display devices, and the manufacture of such display devices and their components.

Particularly, it is multichromal capsules, such as bichromal beads or twisting particles, in shapes such as balls and cylinders, that are used to make multichromal displays. As used herein the word "bichromal" refers to an item that exhibits at least two colors. Thus, in certain embodiments, the word "bichromal" may include multichromal. Similarly, the word "multichromal" includes bichromal. A bichromal display may be known as electric paper, as described in, for example, U.S. Pat. Nos. 6,703,074; 5,389,945; 4,438,160; 4,261,653; 4,143,103; and 4,176,854, each of which is incorporated by reference herein in its entirety. A bichromal display includes twisting particles that individually rotate to display a desired surface or a desired aspect of transparency of the particles to an observer.

Twisting particles can be, for example, a ball or bead having two distinct hemispheres with both an optical anisotropy and an electrical anisotropy due to each hemisphere surface having a different color and electrical charge. When used in a display, the twisting particles are generally embedded in a fluid-filled cavity of a substrate. The substrate is then generally bonded between glass or plastic sheets to create a multichromal display. When an electric field is presented over the display, the twisting particles within the substrate rotate in the fluid in reaction to the electric field.

In particular, the prior methods of encapsulating multichromal beads require numerous steps in making a display. A multichromal capsule includes a single multichromal bead or ball centered in an oil layer within a capsule that rotates under electrical stimulus. However, under current manufacturing processes some capsules may contain more than one bead ("multiples"), some capsules may have no beads, and/or the beads may be stuck to the capsule wall instead of centered in the oil layer. Capsules that contain two or more balls do not exhibit good ball rotation and impede free bead rotation in response to the switching electric field because of interferences between the balls, causing a loss in contrast of a multichromal display image. Removal of these defective capsules is difficult or impossible, and further results in poor product yields. Thus, insufficient contrast ratio and low yield are two significant problems with encapsulation processes for producing display capsules.

Additionally, other processes for fabricating multichromal display devices include the so called "swollen-sheet" method, in which bare multichromal beads, randomly mixed and dispersed in a silicone elastomeric sheet, are rendered rotatable by swelling the elastomer in silicone oil. Pockets of oil form around each bead, and the beads detach from the elastomer-bead interface. However, one problem of a display device made by this method is that it may exhibit limited environmental stability. For example, the most effective encapsulation process for bichromal beads involves a reaction performed at about 62° C. Charge control additives are incorporated into the beads during manufacturing to enhance the bead's electrical charge and thereby allow for good bead rotation. However, at temperatures above 40° C., the additive may diffuse out of the beads and prevent encapsulation. Thus, the contrast ratio and stability of the capsule commonly degrade at temperatures greater than 40° C.

Accordingly, a need exists for a method for producing display capsules having single multichromal beads encapsulated to provide enhanced contrast properties and a method for producing display capsules that prevents the leaching of additives in single multichromal beads during the encapsulation process.

SUMMARY

An embodiment generally is directed to a method for producing a display capsule. The first step is forming a multichromal bead having at least two surfaces differing from each other in optical and electrical characteristics. A dispersing agent is applied on an outer surface of the multichromal bead and the multichromal bead is then encapsulated. The dispersing agent is preferably applied by spray coating. Spray coating of the dispersing agent may be performed by coating the bead with the dispersing agent and a solvent and then drying the bead by introducing warm air while the bead is suspended in the air.

The multichromal bead may include a charge control agent. The dispersing agent may be adsorbed on the outer surface of the multichromal bead. The dispersing agent may include a polymeric material and have a Tg of at least about 90° C. The step of encapsulating the multichromal bead may occur at a temperature greater than approximately 40° C., preferably, at approximately 62° C.

Another embodiment is directed to a method for producing multichromal capsules. A multichromal bead having at least two surfaces differing from each other in optical and electrical characteristics and further including a charge control additive is formed. A dispersing agent on an outer surface of the multichromal bead is applied to prevent diffusion of the charge control additive from the multichromal bead. The multichromal bead is then encapsulated at an encapsulation reaction temperature greater than approximately 40° C.

The dispersing agent is preferably applied by spray coating and may be adsorbed on the outer surface of the multichromal bead. The dispersing agent may be a polymeric material, having a Tg of at least about 90° C. and a thickness of at least 1 µm, more preferably 1–10 µm, and more preferably 1–3 µm. The step of encapsulation may occur at an encapsulating temperature of approximately 62° C. Another embodiment includes a multichromal capsule for use in display applications formed by the above-described method.

Yet another embodiment is directed to a bichromal display capsule. The capsule includes an inner bead having at least two surfaces differing from each other in optical and electrical characteristics, a dispersing agent layer around the inner bead, and an encapsulation layer around the dispersing layer. The inner bead of the capsule may include a charge control agent. The dispersing agent layer may include at least one of a polyester resin dimethicone.

The method described herein generally enables a larger selection of potential dispersing agents than in processes used in industry. In the industry processes, dispersants are limited to a select few that are soluble in the process oil, for example DOW DC200. The method described herein however enables the use of all other dispersants that are not soluble in oil because the dispersant is sprayed onto the bead surface instead of dissolved in oil and then mixed with the beads. Additionally the dispersing agent is less likely to interfere with the encapsulation process, because it is adsorbed on the surface of the multichromal bead instead of dissolved in the reaction medium.

By coating of the multichromal beads (about 100 μm in diameter) with a transparent solid thin coating exhibiting barrier properties, the leaching of the charge control additive and other chemicals from the multichromal beads can be reduced and/or prevented. In accordance with an embodiment, multichromal displays with enhanced environmental stability can be obtained and consequently wider commercial applications are enabled.

Desirable properties of the coating material or dispersing agent include a sufficiently high Tg and molecular weight, optical transparency, and/or compatibility with spray coating. A variety of polymeric materials can be used. Suitable materials include polyester, acrylics, styrene-based copolymer, polycarbonate and the like.

DETAILED DESCRIPTION

An embodiment is generally directed to multichromal capsules and a method of producing multichromal capsules. An embodiment is directed to multichromal beads coated with a dispersing agent and the use of coating multichromal beads with a dispersing agent prior to an encapsulation process. The remainder of the application will interchangeably refer to multichromal beads as bichromal beads, and is by no means limited to only bichromal beads, but is meant to be an example of multichromal beads.

Figure 1:
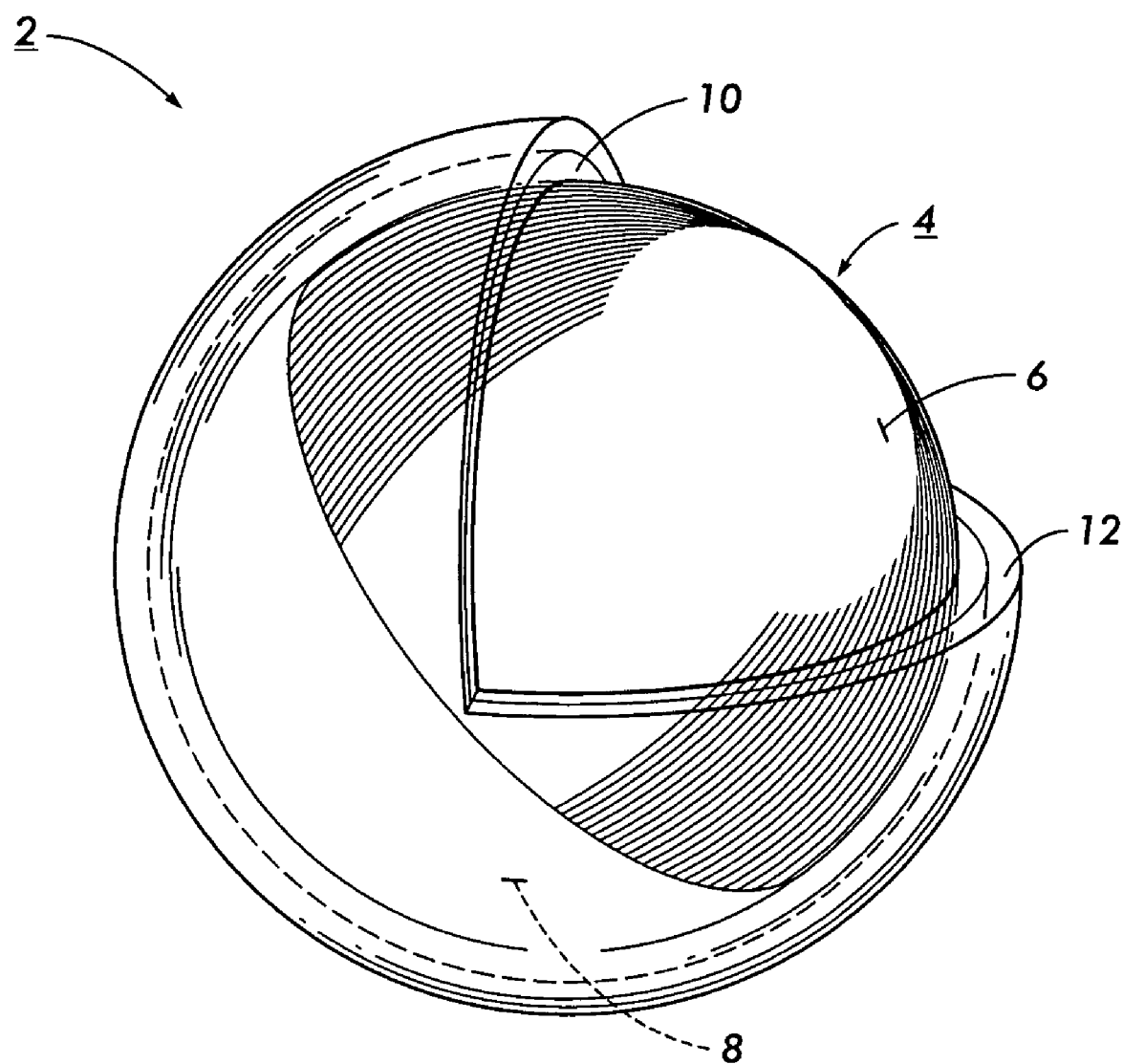
FIG. 1 illustrates a bichromal capsule in accordance with one embodiment.

Display capsules are made by a variety of encapsulation processes. FIG. 1 illustrates an encapsulated bead or bichromal capsule 2. In further detail, the encapsulated display bead 2 includes a bichromal bead 4 formed of a first material 6 and a second material 8. The encapsulated display bead 2 also includes a liquid third material 10 that surrounds the bead 4. The bead 4 and the third material 10 are disposed within a solid fourth material 12.

The first material 6 and the second material 8 divide the display bead 4 into two hemispheres. The hemispheres of the bead 4, namely the first material 6 and the second material 8, having different surface colors, are both optically isotropic and electrically isotropic. The first material 6 and the second material 8 are preferably pigmented plastics. For example, the first material 6 may be black pigmented plastic, while the second material 8 may be white pigmented plastic. Liquid third material 10 is preferably a rotation medium, such as a transparent oil. The bead 4 is encapsulated by and rotates within liquid third material 10. The fourth material 12 acts as an outer skin for the encapsulated display bead 2 and is preferably a transparent material, such as plastic or the like.

The bichromal balls may be made from a variety of plastic and/or wax materials, such as nylon and Carnauba wax. For example, when one hemisphere is white, the material used for the white hemisphere of the ball may be Polywax® 1000 into which titanium dioxide pigment may be dispersed for whiteness. When a black hemisphere is present, a variety of black pigments, such as manganese ferrite or carbon black, may be used in that hemisphere. The third material may be a dielectric liquid, such as that sold under the tradename Isopar® by Exxon Corporation, an elastomer such as polysiloxanes, or it may be silicone oil such as Dow Corning 200 silicone 200 liquid, which may have a 1 or 2 centistoke or lower viscosity. The material of the fourth material/skin 12 may be any highly transparent and physically tough polymer with a temperature/viscosity profile that will allow it to engulf the bead 4 sufficiently quickly to enable encapsulated bead formation. Such materials include, but are not limited to, Polywax 1000 and Polywax 2000.

One process for fabricating a display device is the so-called "swollen sheet" method, in which bare display beads, randomly mixed and dispersed in a silicone electrometric sheet, are rendered rotatable by swelling the elastomer in silicone oil. Pockets of oil form around each bead, and the beads detach from the elastomer-bead interface. The display beads may incorporate a special charge additive, such as 5175 (—5175, is available from Baker-Petrolite and is a copolymer of polyethylene oxide and polyethylene) for optimal performance.

Figure 2:
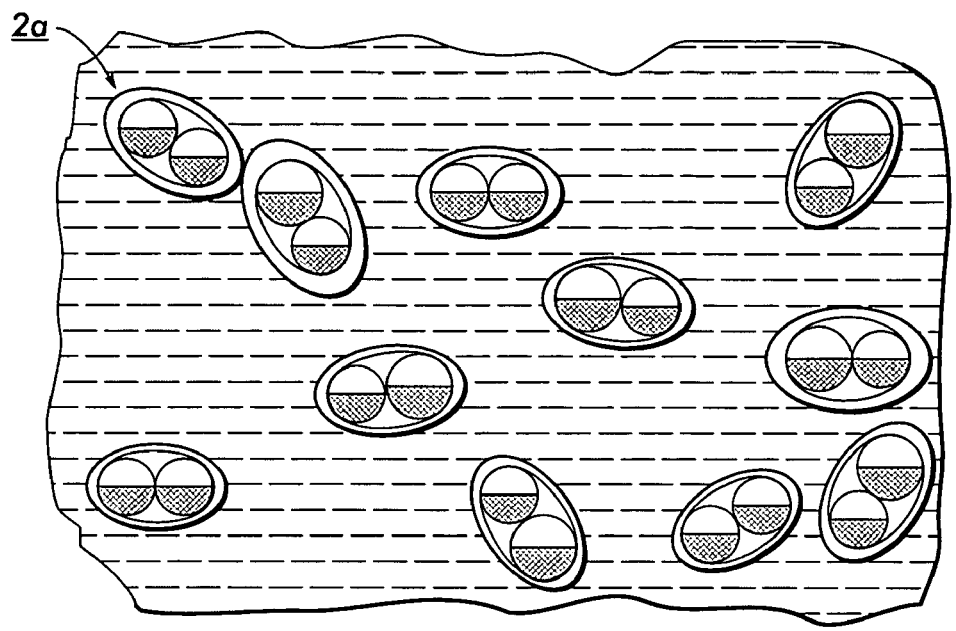
FIG. 2 illustrates encapsulated bichromal beads obtained by methods of the prior art.

FIG. 2 illustrates encapsulated bichromal beads obtained by conventional encapsulation processes. It is illustrated that the prior art encapsulated bichromal bead 2a may stick to the capsule walls and not allow for encapsulation of single beads, thereby affecting contrast properties as well as yield.

Figure 3:
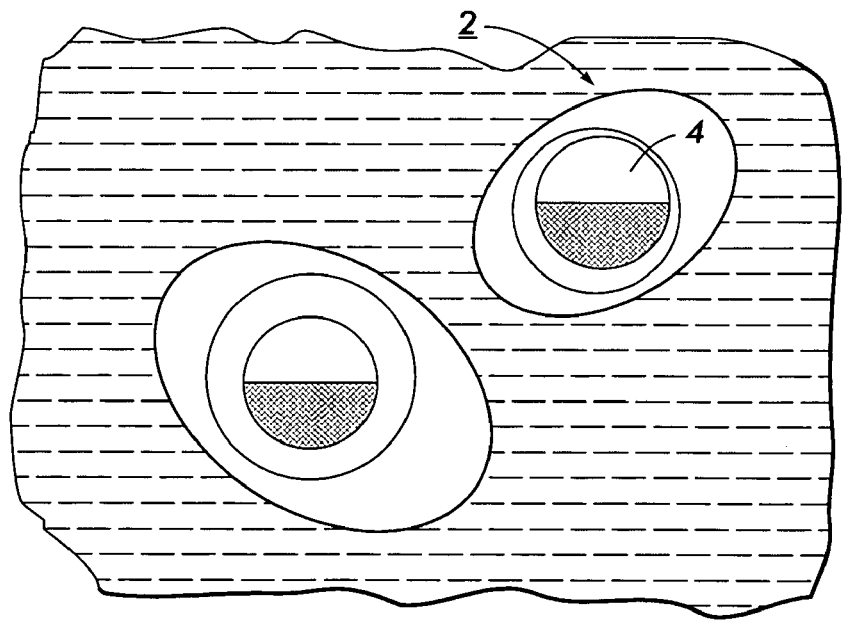
FIG. 3 illustrates encapsulated bichromal beads coated with Dimethicone SF 1642.

Conversely, FIG. 3 illustrates a pair of encapsulated bichromal beads 2 obtained by an embodiment as will be described in more detail hereinafter. In particular, the encapsulated bichromal beads 2 in FIG. 3 include a single bead 4 centered within each capsule.

Figure 4:
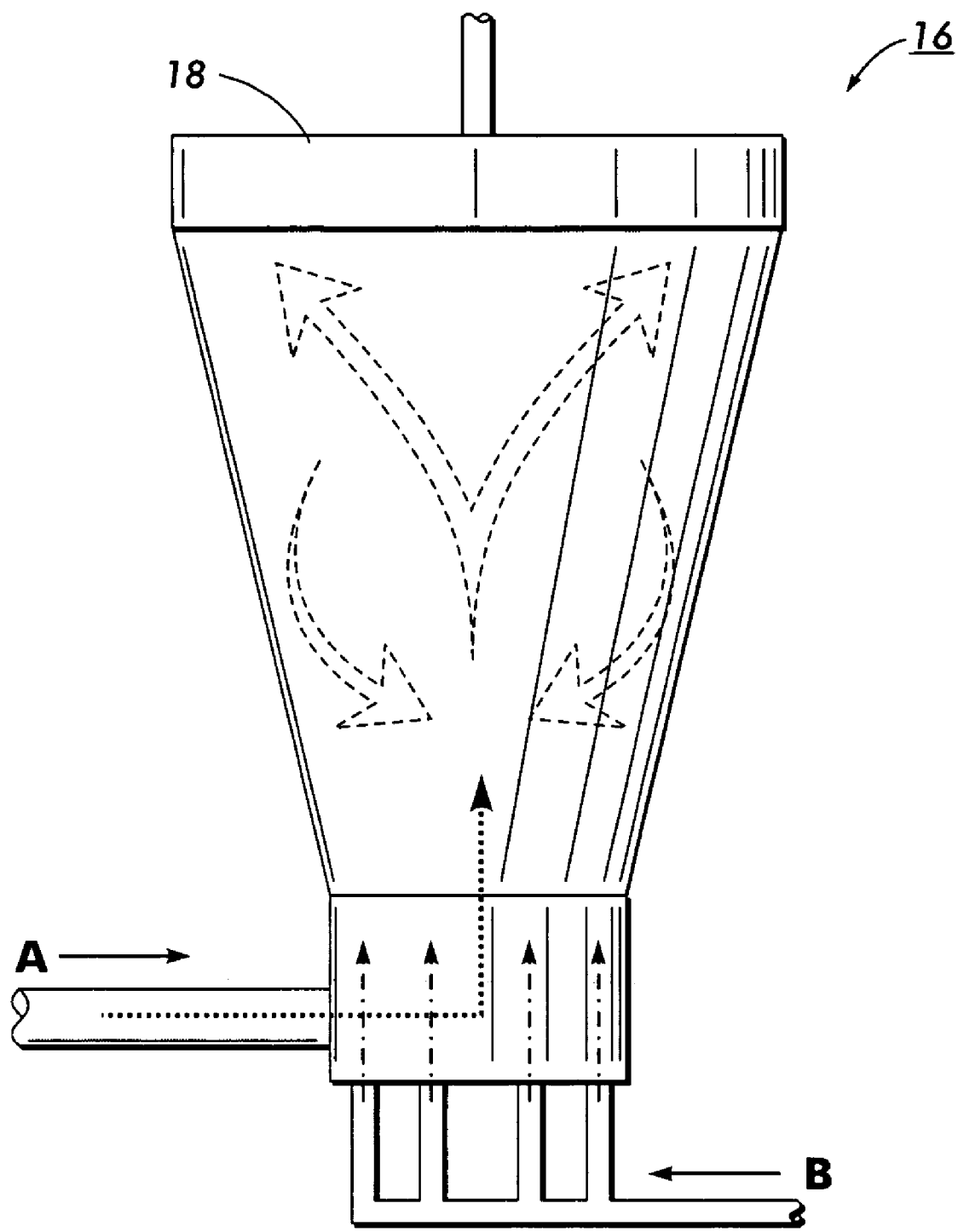
FIG. 4 is a schematic diagram of a spray coating apparatus used in one method of the invention.

In an embodiment, the method includes coating the bichromal bead 4 prior to encapsulation. An example of a spray coating apparatus 16 that may be utilized in this method is illustrated in FIG. 4. In the embodiment, the coating process includes at least the following steps: the first step includes applying a coating/surface or dispersing agent and solvent to the bichromal beads 4. Arrow A illustrates the addition of the surface or dispersing agent and solvent into the spray coating apparatus 16. The solvent is used to dissolve the coating material, for example, a dispersing agent, thus creating a liquid solution that can be sprayed through the nozzle of the coating apparatus. The bichromal beads 4 are then passed through a fluid bed dryer 18 in which warm air is introduced as illustrated by arrow B through the bottom of the fluid bed dryer 18 while the bichromal beads 4 are suspended in air. This step allows the solvent to evaporate while the surface treatment agent is maintained on the surface of the bichromal bead 4. Any coating process may be utilized, preferably the dispersing agent is applied on the bichromal bead 4 by a spray coating process. The bichromal bead 4 then undergoes an encapsulation step. While the coating process has been described hereinabove, the process has been described as merely an illustrative example of coating the bichromal bead and is not by any means limited to the above process.

In an embodiment, the dispersing agent preferably is soluble in oil in order to make the bichromal bead 4 compatible with the oil. In an embodiment, the dispersing agent exhibits a high glass transition temperature, (Tg) and molecular weight, optical transparency, and compatibility with spray coating. A number of polymeric materials may be used, such as polyester, acrylics, styrene-based copolymer, polycarbonates, and the like. Examples of such dispersing agents include dimethicone (such as SF1642), polyester resins such as XP-777, Tego® polymers (e.g. RAD 2200N by Goldschmidt), SPAN surfactants (e.g., SPAN 85 by Aldrich), long chain alcohols (e.g., dodecanol), long chain carboxylic acid (e.g., hexadecanoic acid), and glycerol trioleate. The dispersing agent preferably has thickness of at least 1 µm, more preferably 1–10 µm, and more preferably 1–3 µm on the bichromal bead 4. The dispersing agent is also effective because it preferably does not interfere with the encapsulation process since it is adsorbed on the surface of the bichromal bead 4 instead of dissolved in the reaction medium.

Suitable encapsulation processes are described in further detail in U.S. Pat. No. 6,524,500 to Sheridon et al., U.S. Pat. No. 6,488,870 to Chopra et al., and U.S. Pat. No. 6,703,075 to Sacripante et al., all of which are herein incorporated by reference. Additionally, effective encapsulation processes for multichromal beads involve a reaction that is performed at approximately 62° C. although other temperatures are possible without departing from the scope of the invention. Recent developments in display or bichromal beads include the addition of charge control additives which negatively affect the encapsulation process. The charge control additives function to control the charging of the surface of the capsule when used in a display device. Examples of suitable charge control additives include 5175, (a copolymer of polyethylene oxide and polyethylene) and those described in U.S. Pat. Nos. 6,362,915 and 6,335,818, each incorporated by reference in its entirety and the like. Typically beads having the charge control additives have been difficult to use due to the charge control additive and low molecular weight components diffusing out of the beads at reaction temperatures above 40° C. The charge control agent may also affect the reaction chemistry such that encapsulation is prevented. Alternatively, performing encapsulation processes at temperatures below 40° C. may produce bichromal beads with unsatisfactory functional properties, due to the capsule including more than one bead which in turn does not allow bead rotation to occur. Thus, embodiments discussed herein are beneficial to producing bichromal beads having charge control agents.

In another embodiment, the process is directed to coating bichromal beads 4 having a charge control additive prior to encapsulation for effective encapsulation at temperatures greater than 40° C. The method includes the following steps. Initially a bichromal bead 4 including a charge control additive is provided. The bichromal bead 4 is then coated with a dispersing agent to prevent diffusion or leaching out of the charge control additive out of the beads and into the media. The coating also acts to increase the contrast ratio properties and yield of the bichromal beads as discussed hereinabove. In another embodiment, bichromal beads 4 formed by a process where encapsulation occurs at 62° C. Thus, the method allows process optimization that should significantly improve the functional properties of the bichromal beads 4.

The dispersing agent or coating barrier layer in this embodiment is also applied onto bichromal balls 4 to enhance their environmental stability. The dispersing agent coats the bichromal balls with a polymeric barrier layer with a higher Tg, such as polyester resin (XP-777) which has a Tg of approximately 65° C., to prevent the leaching of additives. For the coating of the dispersing agent to be effective and produce improved mechanical properties, the Tg is preferably above the use temperature. Coatings having low Tg values allow the polymer to flow at elevated temperatures thereby creating holes in the coating through which the control charge additive can diffuse. The use of polymers with high Tg prevents the polymer from flowing. In particular for high temperature applications the Tg value is about 60° C.–200° C., preferably 90°–150° C. Thus the coated bichromal bead 4 can be processed at higher temperature for forming encapsulated balls without the risk of losing the charge control additive. Preferably, the barrier thickness of the dispersing agent or the bichromal bead is at least 1 µm, more preferably 1–10 µm, and more preferably 1–3 µm. Additionally, the dispersing agent produces a transparent solid thin to provide barrier properties.

Yet another embodiment is directed to a bichromal display capsule. The capsule includes an inner bead having at least two surfaces differing from each other in optical and electrical characteristics, a dispersing agent layer around the inner bead, and an encapsulation layer around the dispersing layer. The inner bead of the capsule may include a charge control agent. The dispersing agent layer may include at least one of a polyester resin dimethicone.

The examples below are merely representative of the work that contributes to the teaching of the present invention is not to be restricted by the examples that follow.

EXAMPLE 1

100 g display beads ranging in size from about 75–106 µm and 'mainline' beads containing X-5175 additive were placed inside the chamber of a lab scale Aerocoater (Aeromatic Inc.). The air fan was turned on to suspend the beads in air, and the temperature was set to 40° C. 5 g Dimethicone SF1642 the dispersing agent, was dissolved in 95 g hexanes (obtained from Aldrich) by mixing in a 250 ml beaker on a magnetic stirrer. This solution was pumped into the Aerocoater inlet nozzle at a rate of 1 g/minute using an FMI RP-G20 piston pump. The hexanes evaporated and were expelled through the Aerocoater outlet, leaving the Dimethicone dispersing agent on the surface of the display beads.

The display bead encapsulation included the following steps: Aqueous Phase Preparation: 580 g deionized water was charged into a 1-L stainless steel Buchi reactor. Agitation was started at 700 RPM using a four bladed pitch blade impeller ($Di_{mpellar}/D_{reactor}=0.5$). The reactor was heated to 40° C. at a rate of 1° C./minute. During the heating step, 4.95 g Type A gelatin (300 bloom), 4.95 g Type A gelatin (80 Bloom), and 9.9 g gum arabic were added to the water in the reactor. The solution was mixed at 40° C. for 30 minutes to dissolve the gelatin and gum arabic.

Oil/Bead Preparation: 24.45 g DOW 200 silicon fluid (viscosity=1 cSt) and 5 g multichromal beads (from the above coating step) were mixed in a 100 ml glass beaker using a magnetic stirrer.

Encapsulation: agitation in the Buchi reactor was increased to 1000 RPM, and 9.0 ml acetic acid (20% v/v) was added. The oil/bead mixture was fed into the Buchi reactor at a rate of about 2.0 g/minute. The reactor was then cooled to 5° C. at a rate of 0.5° C./minute. 5.4 g gluteraldehyde (24% aqueous solution) was added to the reactor. The reactor was held at 5° C. for 30 minutes and then heated to 22° C. at 1° C./minute. The agitator was then turned off and the mixture sat overnight.

Intermediate Washing Step: The beads were discharged out of the reactor and into a 100 µm nylon filter bag. Excess liquid was drained off, and the filter containing capsules was transferred to a clean 2-L plastic beaker. 750 mL NaCl solution (0.3 v/v) was added to the beaker, the filter/beads were massaged in the solution, and the solution was then drained off. This washing procedure was repeated four times with 750 mL deionized water to remove residual byproducts.

Empties Removal: The capsules were rinsed out of the filter into a 2L plastic beaker and topped up with 1-L deionized water, and the mixture sat for 30 minutes. Empty capsules (i.e. containing only oil, and no multichromal bead) floated to the surface while encapsulated beads sank to the bottom. The empty beads were suctioned off by vacuum and the remaining encapsulated beads were dewatered by vacuum filtration.

Urea/formaldehyde crosslinking: The capsules and 400-mL deionized water were added to a 2-L plastic beaker, and mixing was started at 650 PRM using a 6-bladed stainless steel pitch blade impeller. 7.48 g urea and 10.19 g formaldehyde (37% aqueous solution) were dissolved in 80 g deionized water by mixing in a 500 mL glass beaker with a magnetic stirrer. The urea/formaldehyde mixture was added to the bead/water mixture, and 10.14 g acetic acid (20% v/v) was then added and mixed for 3.5 hrs. The mixture was poured through a 100 µm nylon filter bag and rinsed with excess water until the filtrate was clear. The remaining multichromal capsules were then dewatered by vacuum filtration and freeze dried overnight to give the final product.

EXAMPLE 2

Display Bead Surface Coating: 90 g display beads (size range=90 to 106 um) were placed inside the chamber of a lab scale Aerocoater (Aeromatic Inc.). The air fan was turned on to suspend the beads in air, and the temperature was set to 40° C. 10 g of the dispersing agent, XP-777 polyester resin was dissolved in 190 g dichloromethane by mixing in a 250 mL Erlenmeyer flask on a magnetic stirrer. This solution was pumped into the Aerocoater inlet nozzle at a rate of 1 g/minute using an FMI QG50 piston pump. The dichloromethane evaporated and was expelled through the Aerocoater outlet, leaving the XP-777 resin on the surface of the display beads.

Display Bead Encapsulation: Aqueous Phase Preparation: 716.5 g deionized water was charged into a 1-L stainless steel Buchi reactor. Agitation was started at 600 RPM using a four bladed pitch impeller ($D_{impeller}/D_{reactor}$=0.5). The reactor was heated to 62° C. at a rate of 1° C./minute. During the heating step, 17.1 g Type A gelatin (300 bloom) and 1.7 g sodium polyphosphate were added to the water in the reactor. The solution was mixed at 62° C. for 30 minutes to dissolve the gelatin and polyphosphate.

Oil/Bead Preparation: 41.8 g Dow 200 silicon fluid (Viscosity=1 cSt) and 15.4 g display beads (from the above coating step) were mixed in a 100 mL glass beaker using a 6-bladed stainless steel pitch blade impeller at 50 RPM. The beads were heated to 70° C. on a hot plate and mixed for 30 minutes.

Encapsulation: Agitation in the Buchi reactor was increased to 1000 RPM, and 2.25 mL acetic acid (20% v/v) was added. The oil/bead mixture was fed into the Buchi reactor at a rate of approximately 15 g/minute. The reactor was then cooled to 22° C. at a rate of 0.5° C./minute, and then to 5° C. at a rate of 1° C./minute. 9.35 mL gluteraldehyde (24% aqueous solution) was added to the reactor. The reactor was held a 5° C. for 30 minutes and then heated to 22° C. at 1° C./minute. The agitator was turned off, and the mixture sat overnight.

Urea/formaldehyde crosslinking: The reactor contents were discharged into a 4L stainless steel beaker and mixing was started at 650 RPM using a 6-bladed stainless steel pitch blade impeller. 34.1 g urea and 46.7 mL formaldehyde (37% aqueous solution) were dissolved in 301.3 g deionized water by mixing in a 500 mL glass beaker with a magnetic stirrer. The urea/formaldehyde mixture was added to the encapsulation mixture, and 12.3 mL acetic acid (20% v/v) was then added and mixed for two hours. The mixture was poured through a 100 µm nylon filter bag and rinsed with excess water until the filtrate was clear. The remaining capsules were then dispersed in 500 g deionized water in a 4L glass beaker, and sat for 30 minutes. Empty capsules floated to the surface of the water while encapsulated display beads sank to the bottom. The empty capsules were suctioned off the surface by vacuum, and the display capsules were then freeze dried.

EXAMPLE 3

Display Bead Surface Coating: 90 g display beads (size range between 90 and 106 µm) were placed inside the chamber of a lab scale Aerocoater (Aeromatic Inc.). The air fan was turned on to suspend the beads in air, and the temperature was set to 40° C. 10 g of the dispersing agent, XP-777 polyester resin was dissolved in 190 g dichloromethane by mixing in a 250 mL Erlenmeyer flask on a magnetic stirrer. This solution was pumped into the Aerocoater inlet nozzle at a rate of 1 g/minute using an FMI QG50 piston pump. The dichloromethane evaporated and was expelled through the Aerocoater outlet, leaving the XP-777 resin on the surface of the display beads.

Prevention of leaching: The effectiveness of the sprayed coating in preventing the leaching of the charge additive was demonstrated in the following experiment: Extensive experiments at XRCC have shown that microencapsulation of the mainline display beads was not possible at a temperature above 40° C. due to leaching of the charge additive. Spray coating of the mainline bead with XP-777 allowed successful microencapsulation at a temperature approximately 62° C.

Swollen-Sheet Display Device Preparation. 2 g of mainline display beads containing the charge additive X-5175 and spray coated with XP-777, 2 g of silicone elastomer Sylgard and 0.3 g of curing agent were thoroughly mixed. The resulting mixture was then coated on a release polyester substrate using a doctor-blade coating apparatus. The coating was then cured at 75° C. for 2 hours. The display device was made by immersing the cured coated sheet in 1 cst silicone oil and sandwiching the soaked sheet between conducting ITO coated glass electrodes. Good rotation of the spray coated beads was observed by application of switching voltage.

Embodiments of the present invention may provide numerous advantages. For example, the encapsulated bichromal bead produced by the method of the present invention may provide improved contrast ratio as well as yield. Additionally, the method of coating the bichromal bead prior to encapsulation may reduce or prevent diffusion of the charge control additive out of the beads and into the media. Embodiments of the present invention may also makes the encapsulation process flexible in that if a different charge control additive were used, the coating would still prevent it from leaching or diffusing out.

While the present invention is satisfied by embodiments in many different forms, there is shown in the drawing and described herein in detail, the preferred embodiments of the invention, with the understanding that the present disclosure is to be considered as exemplary of the principles of the invention and is not intended to limit the invention to the embodiments illustrated. Various other embodiments will be apparent to and readily made by those skilled in the art without departing form the scope and spirit of the invention. The scope of the invention will be measured by the appended claims and their equivalents.

What is claimed is:

1. A method for producing a display capsule comprising:
    forming a multichromal bead having at least two surfaces differing from each other in optical and electrical characteristics and further comprising a charge control agent;
    applying a dispersing agent on an outer surface of the multichromal bead, the dispersing agent comprising a polymeric material, wherein the dispersing agent has a Tg that is above a use temperature of the capsule wherein the use temperature is about 60° C. to about 200° C.; and
    encapsulating the multichromal bead preventing diffusion of the charge control agent outside of the capsule.

2. The method according to claim 1, wherein the dispersing agent is applied by spray coating.

3. The method according to claim 1, wherein the dispersing agent is adsorbed on the outer surface of the multichromal bead.

4. The method according to claim 1, wherein the dispersing agent has a Tg of at least about 90° C.

5. The method according to claim 1, wherein the encapsulating occurs at a temperature greater than approximately 40° C.

6. The method according to claim 1, wherein the encapsulating occurs at approximately 62° C.

7. The method of claim 2 wherein the spray coating is performed by:
    coating the bead with the dispersing agent and a solvent; and
    drying the bead by introducing warm air while the bead is suspended in the air.

8. A method for producing multichromal capsules, comprising the steps of
    forming a multichromal bead having at least two surfaces differing from each other in optical and electrical characteristics and further comprising a charge control additive;
    applying a dispersing agent on an outer surface of the multichromal bead to prevent diffusion of said charge control additive from the multichromal bead, wherein the dispersing agent comprises a polymeric material and has a Tg that is above a use temperature of the capsule wherein the use temperature is about 60° C. to about 200° C.; and
    encapsulating the multichromal bead at an encapsulation reaction temperature greater than approximately 40° C.

9. The method according to claim 8, wherein the dispersing agent is applied by spray coating.

10. The method according to claim 8, wherein the dispersing agent is adsorbed on the outer surface of the multichromal bead.

11. The method according to claim 8, wherein the dispersing agent has a Tg of at least about 90° C.

12. The method according to claim 8, wherein the dispersing agent is applied at a thickness of at least 1 μm.

13. The method according to claim 8, wherein the encapsulating occurs at approximately 62° C.

14. The method of claim 1 wherein the multichromal bead with the dispersing agent is further coated with a rotation medium prior to encapsulation.

15. The method of claim 8 wherein the multichromal bead with the dispersing agent is further coated with a rotation medium prior to encapsulation.

16. A method for producing a display capsule comprising:
    forming a multichromal bead having at least two surfaces differing from each other in optical and electrical characteristics and further comprising a charge control agent;
    applying a dispersing agent on an outer surface of the multichromal bead, the dispersing agent comprising a polymeric material, wherein the dispersing agent has a Tg that is above 90° C.; and
    encapsulating the multichromal bead thereby preventing diffusion of the charge control agent outside of the capsule.

17. The method of claim 16, wherein the encapsulating occurs at a temperature greater than approximately 40° C.

18. The method of claim 16, wherein the multichromal bead with the dispersing agent is further coated with a rotation medium prior to encapsulation.

* * * * *